United States Patent [19]
Oishi et al.

[11] Patent Number: 5,422,182
[45] Date of Patent: Jun. 6, 1995

[54] LIGHT TRANSMITTING GLASS FIBER

[75] Inventors: Kazumasa Oishi; Nobuhiro Akasaka; Tatsuya Kakuta; Wataru Katsurashima; Yasuo Matsuda, all of Yokohama; Shigeru Tomita, Mito, all of Japan

[73] Assignees: Sumitomo Electric Industries, Ltd., Osaka; Nippon Telegraph & Telephone Corporation, Tokyo, both of Japan

[21] Appl. No.: 63,788

[22] Filed: May 20, 1993

[30] Foreign Application Priority Data

May 20, 1992 [JP] Japan ................... 4-151179
May 20, 1992 [JP] Japan ................... 4-151180

[51] Int. Cl.6 ............................................ D02G 3/00
[52] U.S. Cl. ............................ 428/373; 428/374; 428/375; 428/392; 428/370; 385/128; 385/145
[58] Field of Search ............... 428/374, 373, 375, 392, 428/370, 522, 385

[56] References Cited

U.S. PATENT DOCUMENTS

| | | | |
|---|---|---|---|
| 4,114,981 | 8/1978 | Ishida et al. | 385/128 |
| 4,334,733 | 6/1982 | Takeshima et al. | 385/128 |
| 4,472,019 | 8/1984 | Bishop et al. | 385/128 |
| 4,514,037 | 4/1985 | Bihop et al. | 428/397 |
| 4,585,534 | 4/1986 | Pasternack et al. | 522/100 |
| 4,621,896 | 11/1986 | Lagakos et al. | 385/128 |
| 4,690,503 | 9/1987 | Janssen et al. | 385/128 |
| 4,741,958 | 5/1988 | Bishop | 385/128 |
| 4,904,051 | 2/1990 | Broer et al. | 428/373 |
| 4,997,260 | 3/1991 | Honjo et al. | 385/128 |

FOREIGN PATENT DOCUMENTS

| | | |
|---|---|---|
| 0239641 | 10/1987 | European Pat. Off. |
| 0254275 | 1/1988 | European Pat. Off. |
| 0311186 | 4/1989 | European Pat. Off. |
| 3147137 | 6/1983 | Germany |

Primary Examiner—N. Edwards
Attorney, Agent, or Firm—Cushman Darby & Cushman

[57] ABSTRACT

A light transmitting optical fiber having at least one coating layer of an ultraviolet curing resin on an outer surface of the fiber, in which the ultraviolet curing resin used in an outermost layer has a Young's modulus of at least 100 kg/mm² and an elongation of at least 30%.

2 Claims, 3 Drawing Sheets

LIGHT TRANSMITTING GLASS FIBER

BACKGROUND OF THE INVENTION

1. Field of the Invention

The present invention relates to a light transmitting glass fiber used in a optical telecommunication. In particular, it relates to a thin layer-coated light transmitting glass fiber (an outer diameter of an coating: at most 200 μm). In the present invention, a coating resin of a resin-coated optical fiber is improved.

2. Description of Related Art

Because a light transmitting glass fiber (optical glass fiber) has a poor mechanical property and a poor light transmitting property in a state of a drawn fiber, it has a coating layer such as a polymeric material on its circumference.

As the polymeric material, an ultraviolet curing resin (hereinafter referred to as "UV resin") is generally used in view of the productivity. The coating generally has two-layer structure. An inner layer is a relatively soft buffer layer (the coating outer diameter: about 200 μm, Young's modulus: about 0.1–0.2 kg/mm$^2$) and an outer layer is a rigid protecting layer (the coating outer diameter: about 250 μm, Young's modulus: 30–100 kg/mm$^2$).

Recently, the higher density of a telecommunication cable is required for changing the cable to an optical fiber cable in a telephone network.

In a tape slot cable which has the gathered plural tape glass fibers formed by parallel tying plural UV resin-coated optical fibers into a bundle and coating the bundle with a common UV resin coating, the conventional coating outer diameter (about 250 μm) cannot give the higher density. Accordingly, the thin coating (the outer diameter of the outermost layer: about at most 200 μm) is developed.

However, the thin layer-coated optical fiber (the outer diameter of the coating layer: at most 200 μm) comprising a conventional UV resin (Young's modulus: 30–100 kg/mm$^2$) as the coating material of the outermost layer gives an extreme decrease of lateral pressure resistance because of the thin coating layer.

Thus, in order to improve the lateral pressure resistance in the thin layer-coated optical fiber (the outer diameter of the coating layer: at most 200 μm), the UV resin of the outermost layer is intended to have a very high Young's modulus, whereby giving substantially the same lateral pressure resistance as the conventional coated optical fiber (the outer diameter of the coating layer: about 250 μm)

A term "lateral pressure property" herein means that a fine curvature arises to increase the light transmittance loss of the fiber when an external pressure (lateral pressure) is applied to the fiber. The term "lateral pressure resistance" means that the increase of the light transmittance loss is inhibited on the application of the lateral pressure.

In the thin layer-coated optical fiber (the outer diameter of the coating: at most 200 μm) which has an outermost coating layer of a UV resin having a very high Young's modulus of at least 100 kg/mm$^2$, the light transmitting property is deteriorated and the screening break strength decreases.

The reason therefor seems to be that since the UV resin used for the outermost layer has a high Young's modulus and a very low elongation (about 6%), (1) a scratch on the coating surface easily becomes a crack and the outermost layer buckles and gives the ununiform distortion to the glass part so as to deteriorate the light transmitting property, and (2) the fiber easily breaks at the screening because of a growth of the crack.

The term "screening" herein means a test which ensures a minimum strength in longitudinal direction by applying a constant pulling force to a whole length of the fiber.

The term "elongation" herein means a ratio in percentage of an elongated length to an original length until a sample breaks in a tensile test.

SUMMARY OF THE INVENTION

An object of the present invention is to provide a light transmitting glass fiber which has an excellent lateral pressure property, an excellent light transmitting property and improved screening strength.

This and other objects of the present invention are achieved by a light transmitting glass fiber having at least one coating layer of an ultraviolet curing resin on an outer surface of the fiber, wherein the ultraviolet curing resin used for an outermost layer has a Young's modulus of at least 100 kg/mm$^2$ and an elongation of at least 30%.

DETAILED DESCRIPTION OF THE INVENTION

The Young's modulus of the outermost layer resin is preferably from 130 to 160 kg/mm$^2$. The ultimate elongation of the outermost layer resin is preferably from 30 to 100%, more preferably from 40 to 60%.

In the fiber of the present invention, a value of elongation (%)/Young's modulus (kg/mm$^2$) of the ultraviolet curing resin used for the outermost layer is preferably at least 0.2, more preferably from 0.3 to 0.5.

An outer diameter of the outermost layer is preferably at most 200 μm, preferably from 180 to 200 μm.

The present invention is explained hereinafter with referring to attached drawings.

Figure 4:
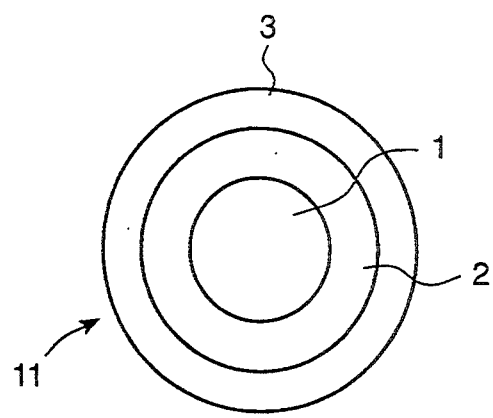
FIG. 4 is a cross-sectional view of a resin-coated optical fiber of the present invention.

The light transmitting glass fiber of the present invention basically has a plural-layer structure, preferably two-coating-layer structure in view of the thin coating, as shown in FIG. 4. A glass fiber 1 is coated with a buffer layer 2 and an outermost protecting layer 3 having the property values defined in the present invention to form a light transmitting fiber 11. A diameter of the glass fiber 1 is usually from 100 to 150 μm, preferably from 120 to 130 μm, more preferably from 124 to 126 μm. A thickness of the buffer layer 2 is usually from 10 to 30 μm. A thickness of the outermost layer 3 is usually from 10 to 30 μm.

An ultraviolet curing resin constituting the the outermost protecting coating layer 3 is not limited, insofar as it gives the high Young's modulus value and the high elongation value as defined above, after the curing. Preferable examples of the ultraviolet curing resin are an epoxy acrylate, a urethane acrylate and an ester acrylate, since these relatively easily give the high Young's modulus value and the high elongation value.

Although the ultraviolet curing resin (usually in the form of oligomer) alone may be used, a photoinitiator and/or a polyfunctional monomer may be used together with the resin.

The buffer layer may be the same resin as the ultraviolet curing resin of the outermost layer, or may be a relatively soft coating material such a silicone resin.

If necessary, an additional layer, a material of which is the same as or different from the protecting layer 3 or the buffer layer 2, may be provided.

Figure 5:
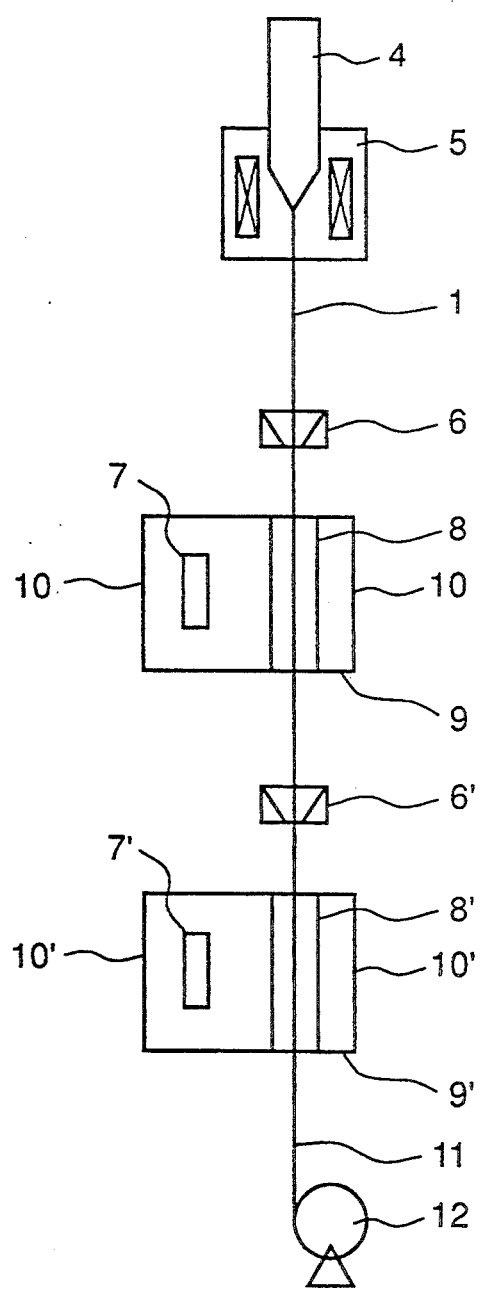
FIG. 5 is a schematic view of an apparatus for preparing a light transmitting fiber of the present invention.

The light transmitting glass fiber of the present invention can be prepared by a conventional optical fiber preparation apparatus shown in FIG. 5. A glass preform 4 is drawn into a glass fiber 1 and the glass fiber 1 is coated with resin layers to form a resin-coated light transmitting fiber 11. The apparatus has a) a drawing furnace 5, b) two resin coating units 6 and 6', c) two ultraviolet light irradiation units 9 and 9' equipped with an ultraviolet light irradiation lamp 7 (and 7'), a tube 8 (and 8') and a reflector 10 (and 10'), and d) a wind-up machine 12.

The outermost coating layer 3 acts to protect the glass fiber 1 from the external pressure. The higher the Young's modulus of the outermost coating layer 3 is, the higher the resistance to external pressure (lateral pressure) of the outermost coating layer 3 is. However, when outermost layer 3 has a low elongation property, the outermost layer has extremely low resistance to flexure and easily breaks.

The low elongation property gives the ununiformity of the coating surface and gives the distortion to the glass so that the light transmitting property is deteriorated and the strength of the fiber decreases. Accordingly, the resin of the outermost layer must have a high Young's modulus and a high elongation property.

In the present invention, the relationship between the light transmitting property and the Young's modulus of the outermost coating layer material and the relationship between the light transmitting property and the elongation of the outermost coating layer material were studied. In the fiber having the thin coating (the outer diameter of the coating: at most 200 μm), we found the values of the Young's modulus and the elongation which give good light transmitting property together with good lateral pressure resistance.

In the fiber having thicker coating layer (the outer diameter of the coating: about 250 μm), the effect of high Young's modulus of the outermost coating layer is low and the high Young's modulus is almost unnecessary since the coating layer is sufficiently thick. However, in the fiber having thin coating layer (the outer diameter of the coating: at most 200 μm), the high Young's modulus value and the high elongation value defined in the present invention are necessary.

PREFERRED EMBODIMENT OF THE INVENTION

The present invention will be illustrated by the following Examples which do not limit the present invention.

EXAMPLES 1 to 8

Using the optical fiber preparation apparatus shown in FIG. 5, the glass preform 4 was drawn in the drawing furnace 5 to prepare the glass fiber 1 (the diameter: 125 μm). The glass fiber 1 was passed through the resin coating units 6 and 6' to provide the ultraviolet curing resin coatings on the glass fiber 1. The ultraviolet curing resin coatings were cured by the ultraviolet light irradiation units 9 and 9' to form the thin layer-coated optical fiber 11 shown in FIG. 4.

In Examples 1–6, an ultraviolet curing urethane acrylate resin having a Young's modulus of 0.10 kg/mm² at a room temperature was used as the inner layer (buffer layer) 2 and the outer diameter of the inner layer 2 was 150 μm.

Various ultraviolet curing urethane acrylate resins shown in Table which have different Young's modulus values and elongation values were used as the outer layer (protecting layer) 3 and the outer diameter of the outer layer was 180 μm.

A lateral pressure property and a light transmitting property were evaluated. The results are shown in Table.

Results for a conventional optical fiber having a thick coating layer (the outer diameter of the coating: 250 μm) (Examples 7 and 8) are also shown in Table.

TABLE

| Example No. | Material of outer coating layer | | | | Lateral pressure property $\Delta\alpha$ (dB) *1) | Light transmitting property (dB/km) *2) | Screening break strength frequency (number of times) *3) |
| --- | --- | --- | --- | --- | --- | --- | --- |
| | Outer diameter (μm) | Young's modulus (kg/mm²) | Elongation (%) | Elongation/ Young's modulus | | | |
| 1 | 180 | 80 | 60 | 0.75 | 1.00 | 0.20 | 1 |
| 2 | ↑ | 150 | 10 | 0.07 | 0.30 | 0.35 | 10 |
| 3 | ↑ | 80 | 15 | 0.19 | 1.00 | 0.25 | 5 |
| 4 | ↑ | 150 | 35 | 0.23 | 0.25 | 0.21 | 2 |
| 5 | ↑ | 180 | 25 | 0.14 | 0.20 | 0.30 | 8 |
| 6 | ↑ | 120 | 35 | 0.29 | 0.30 | 0.21 | 1 |
| 7 | 250 | 80 | 60 | 0.75 | 0.20 | 0.20 | 0.5 |
| 8 | ↑ | 150 | 10 | 0.07 | 0.15 | 0.20 | 0.5 |

Note:
*1) Plate lateral pressure test: indicated by the increase of light transmittance loss; $\Delta\alpha$ (1.55 μm) at a loading of 50 kg.
*2) Light transmitting property with the fiber winded on a bobbin (1.55 μm).
*3) Break number per 100 km in a 700 g screening test.
4) Young's modulus and elongation were determined according JIS method.

Figure 1:
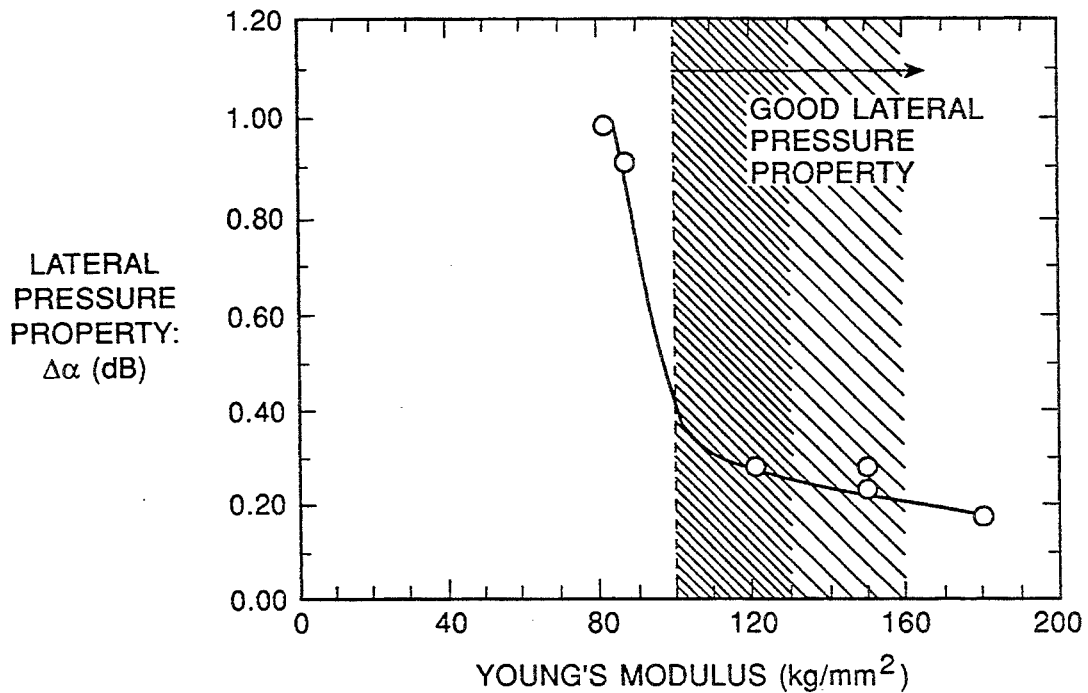
FIG. 1 is a graph showing a relationship between a lateral pressure property and a Young's modulus of a resin of an outermost layer.

FIG. 1 shows the relationship between the lateral pressure property and the Young's modulus of the coated optical fibers of Examples 1–6 shown in Table.

Figure 2:
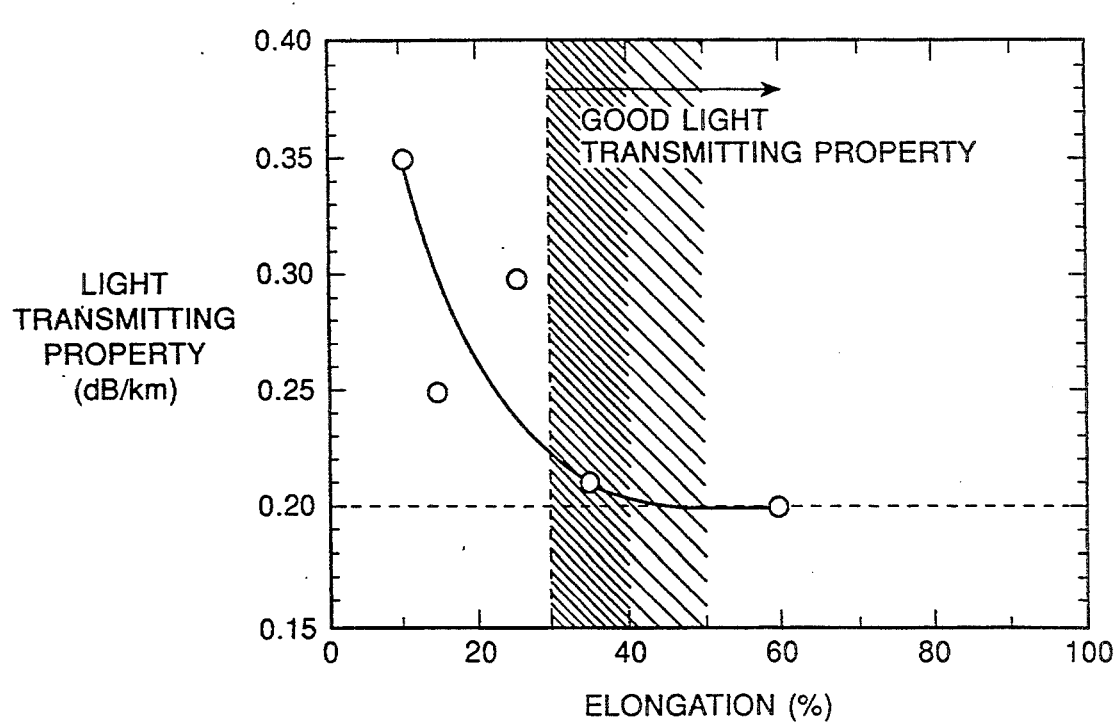
FIG. 2 is a graph showing a relationship between a light transmitting property and an elongation of a resin of an outermost layer.

FIG. 2 shows the relationship between the light transmitting property and the elongation.

From the above results, it is clear that the fiber having the thin coating layer can have almost the same lateral pressure property as the fiber having the thick coating layer, when the resin of the outermost layer has the Young's modulus of at least 100 kg/mm$^2$.

In addition, it is clear that the fiber having the thin coating layer has almost the same light transmitting property and fiber strength as the fiber having the thick coating layer, when the resin of the outermost layer has the elongation of at least 30%.

Figure 3:
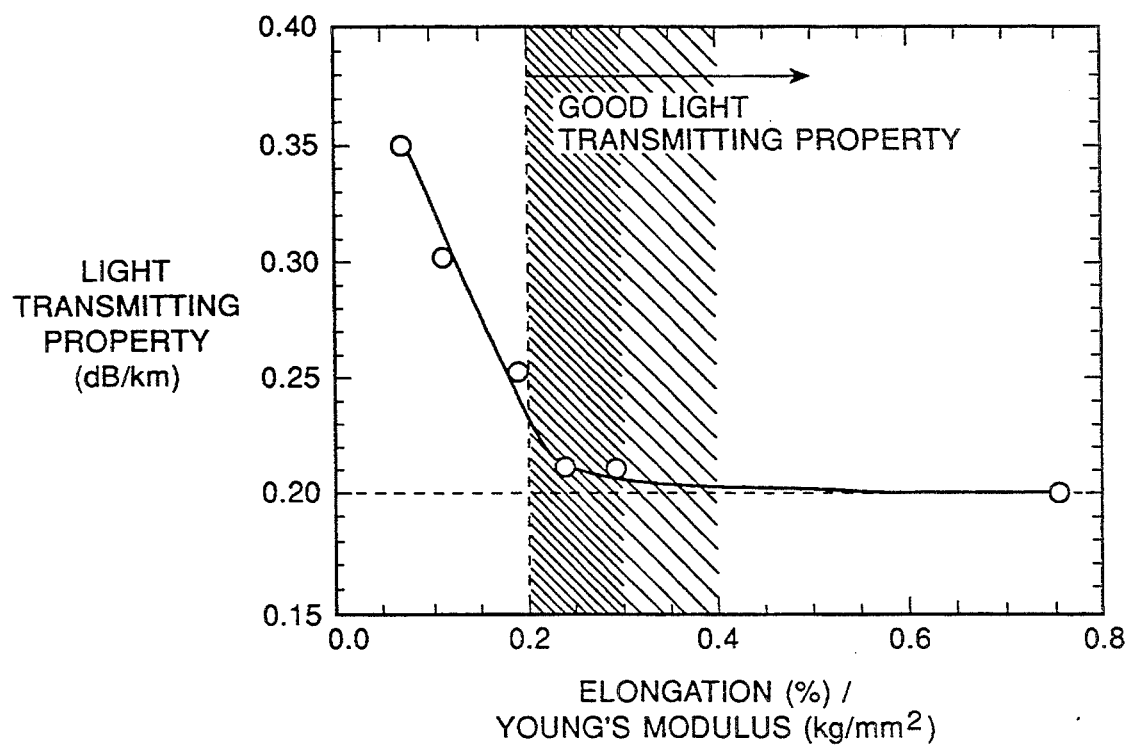
FIG. 3 shows the relationship between a light transmitting property and a value of [elongation (%) ÷ Young's modulus (kg/mm$^2$)] of a resin of an outermost layer.

FIG. 3 shows the relationship between the light transmitting property and the value of [elongation (%) ÷ Young's modulus (kg/mm$^2$)] of the outermost layer resin.

From this results, it is clear that the fiber having the thin coating layer can have almost the same light transmitting property and fiber strength as the fiber having the thick coating layer, when the value of [elongation (%) ÷ Young's modulus (kg/mm$^2$)] of the outermost layer resin is at least 0.2.

In the above explanation, the fiber of the present invention has one inner layer and one outer layer. The fiber of the present invention may have at least one coating layer of the ultraviolet curing resin. For example, the fiber of the present invention may have one coating layer or at least three coating layers. The outermost layer of the coating must have the defined Young's modulus and elongation values.

The present invention can provide the optical fiber having the thin coating layer (outer diameter of the coating layer: at most 200 μm) which has good light transmitting property and fiber strength and is very useful in a high density optical cable.

What is claimed is:

1. A light transmitting glass fiber having at least one coating layer of an ultraviolet curing resin on an outer surface of the fiber, wherein the ultraviolet curing resin used for an outermost layer has a Young's modulus of at least 100 kg/mm$^2$ and an elongation of at least 30% and wherein said light transmitting glass fiber has an outer diameter of at most 200 μm.

2. The light transmitting glass fiber according to claim 1, wherein a value of elongation (%)/Young's modulus (kg/mm$^2$) of the ultraviolet curing resin used for the outermost layer is at least 0.2.

* * * * *